United States Patent [19]
Woudenberg et al.

[11] Patent Number: 5,872,882
[45] Date of Patent: Feb. 16, 1999

[54] NON-LINEAR OPTICAL POLYCARBONATES

[75] Inventors: Richard Herman Woudenberg, Elst; Tjerk Oedse Boonstra, Duiven; Johannes Wilhelm Ladage, Hunteren; Ulfert Elle Wiersum, Velp, all of Netherlands

[73] Assignee: Akzo Nobel NV, Arnhem, Netherlands

[21] Appl. No.: 913,206

[22] PCT Filed: Feb. 28, 1996

[86] PCT No.: PCT/EP96/00847

§ 371 Date: Oct. 30, 1997

§ 102(e) Date: Oct. 30, 1997

[87] PCT Pub. No.: WO96/28757

PCT Pub. Date: Sep. 19, 1996

[30] Foreign Application Priority Data

Mar. 13, 1995 [EP] European Pat. Off. .............. 95200598

[51] Int. Cl.$^6$ ...................................................... G02B 6/00
[52] U.S. Cl. .......................... 385/122; 252/582; 252/587; 252/589; 385/131; 385/143; 385/145; 428/412; 525/463; 525/467; 528/196; 528/199; 528/201
[58] Field of Search ..................................... 385/122, 131, 385/143, 145; 252/582, 587, 589; 428/412; 525/463, 467; 528/196, 199, 201

[56] References Cited

U.S. PATENT DOCUMENTS

| | | | |
|---|---|---|---|
| 1,991,273 | 2/1935 | Earnshaw | 224/2 |
| 2,964,974 | 12/1960 | Loutrel | 74/665 |
| 2,970,137 | 1/1961 | Whitlock | 528/196 |
| 2,999,835 | 9/1961 | Goldberg | 528/196 |
| 2,999,846 | 9/1961 | Schnell et al. | 528/196 |
| 3,028,365 | 4/1962 | Schnell et al. | 528/196 |
| 3,153,008 | 10/1964 | Fox | 528/196 |
| 3,187,065 | 6/1965 | McPherson et al. | 528/198 |
| 3,215,668 | 11/1965 | Bissinger et al. | 528/196 |
| 3,248,414 | 4/1966 | Stevens | 528/190 |
| 5,208,299 | 5/1993 | Bales et al. | 525/437 |

FOREIGN PATENT DOCUMENTS

| | | |
|---|---|---|
| 350 112 | 1/1990 | European Pat. Off. . |
| 571 271 | 11/1993 | European Pat. Off. . |
| 608 493 | 8/1994 | European Pat. Off. . |
| 05142600 | 6/1993 | Japan . |
| WO 91/18939 | 12/1991 | WIPO . |
| WO 94/01480 | 1/1994 | WIPO . |
| WO 94/08269 | 4/1994 | WIPO . |

OTHER PUBLICATIONS

Clagett, et al., *Comprehensive Polymer Science: The Synthesis, Characterization, Reactions and Applications of Polymers*, Ch. 20 "Polycarbonates", 345–356 (Pergamon Press).

Hoekstra, et al., "Photoluminescence and attenuation of spray–pyrolysis–deposited erbium–doped $Y_2O_3$ planar optical waveguides", 17 *Optics Letters*, 1506–1508 (1992).

March, *Advanced Organic Chemistry*, "Reactions, Mechanisms, and Structure", 242–250 (John Wioley & Sons 1985).

Int'l. Search Report in PCT/EP96/00847 dated Jun. 24, 1996.

*Primary Examiner*—Terressa Mosley
*Attorney, Agent, or Firm*—Loretta A. Miraglia; Louis A. Morris

[57] ABSTRACT

The invention relates to non-linear optically active (NLO) polycarbonates and to NLO active waveguides containing these polycarbonates. Waveguides containing these NLO polycarbonates have a low loss of signal, a high glass transition temperature and good polability and a high stability of the Pockel's coefficient.

11 Claims, No Drawings

NON-LINEAR OPTICAL POLYCARBONATES

The invention relates to non-linear optically active polycarbonates and to photonic components comprising these polycarbonates. More particularly, the present invention relates to novel non-linear optical (NLO) polycarbonates which exhibit a high degree of polability and a high stability of the Pockel's effect.

BACKGROUND OF THE INVENTION

Non-linear optical materials are typically employed for modulation of optical signals and for frequency conversion of laser light. Such non-linear optical materials generally comprise optically active groups which include a delocalised pi system connected on one side to an electron donating group and on the other to an electron withdrawing group. The term donor-pi-acceptor (DnA) system is often used in this context. When non-linear optical material is poled by the influence of an external electric field of force, a number of optically non-linear phenomena including frequency doubling and Pockel's effect are observed. By utilizing these phenomena, it is possible to employ the non-linear optical material in waveguiding components such as optical switches and frequency doublers. Non-linear optical materials which have been employed in electro-optic devices have, in general, been inorganic crystals such as lithium niobate or potassium dihydrogen phosphate. More recently, non-linear optical materials based on organic molecules, and in particular polar organic molecules, have been developed. The advantages of organic non-linear optical materials are their higher NLO activity on a molecular basis, their ability to provide very fast switching times in electro-optic devices, their low dielectric constant which enables higher electro-optic modulating frequencies to be achieved for a given power consumption and their ease of fabrication into integrated device structures, particularly when employed in polymeric form.

Some non-linear optical polymers are known in the prior art. For example, U.S. Pat. No. 5,208,299 discloses a variety of non-linear optical polymers derived from dihydroxyaryl-hydrazones. Such polymers may be polycarbonates, polyestercarbonates, and poly(hydroxyethers). In the examples a polycarbonate is described which is obtained by the polymerisation of a dihydroxyphenyl hydrazone and bisphenol A. Although these materials exhibit NLO activity upon orientation and have a relatively high glass transition temperature, their optical transparency has been found to be less than optimal. Japanese Patent Publication No. J-05-142,600 also discloses NLO polymers including fluorine-containing polyurethanes, polyimides, polyesters, polyamides, polycarbonates, and polyethers. These materials are said to exhibit NLO activity and have a refractive index which is easily controlled to match quartz-type waveguide media. Published European Patent Application No. 571 271 discloses second-order non-linear optical polymers and methods for producing them. Among the optical polymers mentioned are polysiloxanes, polymethacrylates, polyesters, polyurethanes, polyamides, polyimides, polyacrylates, polystyrenes, polycarbonates, and polyethers, as well as derivatives and/or copolymers thereof. The non-linear optical components are bonded to the polymer backbone. Our own copending European Patent Application No. 94202733 discloses non-linear optical polycarbonates which include a DπA system comprising a donor bonded to an aromatic group, which aromatic group is bonded via a conjugated bond to an aromatic or conjugated cyclic group, which in its turn is bonded to the acceptor group. These materials exhibit a low loss of signal, good polability, and high Tgs. The main drawback to polymeric waveguides made from the above-described polymers is that they do not provide an optimal combination of properties. More particularly, such polymeric materials should have a high glass transition temperature, good polability, high stability of the Pockel's coefficient and minimal loss of signal. Although some of the foregoing polymers exhibit good properties in one or two of these areas, none of these materials provides an optimum combination of these properties.

The present invention provides an NLO polycarbonate with low loss of signal, good polability, high stability of the Pockel's coefficient and a high glass transition temperature.

SUMMARY OF THE INVENTION

The invention is characterised in that the NLO polycarbonate is obtained from a monomer mixture comprising:

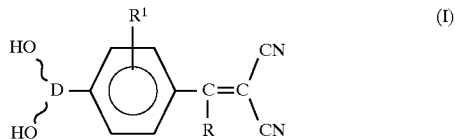

wherein D is a trivalent electron-donating group comprising 2–30 aliphatic, alicyclic, aromatic or heterocyclic carbon atoms and which includes at least one atom selected from alkoxy oxygen atoms, sulphur atoms, selenium atoms and nitrogen atoms directly or conjugatedly bonded to the benzene ring; R is selected from hydrogen, (halogenated) $C_1$–$C_6$ alkyl and cyano; R1 is selected from halogen, -R2, -OR2, -$COR_2$, -CN and -$CF_3$; and $R^2$ is selected from hydrogen, halogen, $C_1$–$C_6$ alkyl and halogen-substituted $C_1$–$C_6$ alkyl, and a compound according to formula II:

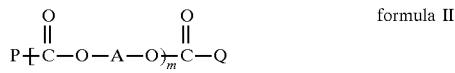

wherein: P stands for -Cl, O-$R_3$, imidazole,

Q stands for -Cl, O-$R^3$, imidazole, $R^3$ stands for a (halogenated) alkyl group having 1–6 carbon atoms, a (halogenated) phenyl group, A stands for

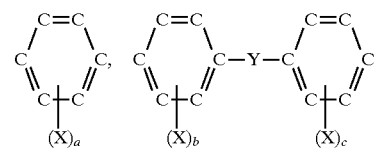

Y stands for -$SO_2$-, halogenated alkyl having 1–6 carbon atoms, preferably -$CF_2$-, -$C(CF_3)_2$, -O-, -S-, cycloalkyl having 4–12 carbon atoms, dianhydrohexosyl,-$C(C_6H_5)_2$-, X is a halogen, $C_1$–$C_6$ halo alkyl, a is an integer from 0 to 4, with the X-groups being the same or different, b is an integer from 0 to 4, with the X-groups being the same or different, c is an integer from 0 to 4, with the X-groups being the same or different, m is an integer from 0 to 5, with the A-groups being the same or different.

DETAILED DESCRIPTION OF THE INVENTION

It is important that the compounds according to formula II do not contain aliphatic C-H bonds, in order to obtain polycarbonates with low light loss. With the use of monomers according to formula I polycarbonates are obtained which provide waveguides with good polability and high stability of the Pockel 's coefficient. By stability of the Pockel's coefficient is meant the extent to which the Pockel 's coefficient remains intact after the electric field has been switched off. The polycarbonates according to the invention further appear to have high glass transition temperatures.

The polycarbonates of the present invention are obtained by reacting diols according to formula I in a basic solvent, such as pyridine or tetrahydrofuran containing a tertiary amine, with a monomer according to formula II. If it is desired to obtain a particular molecular weight, a quantity of chain stopper can be employed during the polymerisation. A typical chain stopper would be a phenol. Further details regarding the preparation of polycarbonates can be found in *Comp. Pol. Sci.: The Synthesis, Characterization, Reactions and Applications of Polymers,* Volume 5 (Pergamon Press), Chapter 20, pages 345–356. In addition, methods for preparing polycarbonate resins are also set forth in U.S. Pat. Nos. 3,248,414; 3,153,008; 3,215,668; 3,187,065; 3,028,365; 2,999,846; 2,964,974; 2,970,137; 1,991,273; and 2,999,835. The term "electron-donating" as employed herein refers to any substituent which donates electrons to a conjugated electron structure thereby providing a polarised resonating structure. A quantification of the level of electron-donating capability is given by the Hammett Sigma ($\sigma$) constant. This well known constant is described in many references, for instance, J. March Advanced Organic Chemistry (McGraw-Hill Book Company, New York, 1977 Edition), Pages 251–259. The $\sigma$ values are negative for electron-donating groups.

Preferred electron-donating groups D (of Formula I) for use in the polycarbonates of the present invention are listed below.

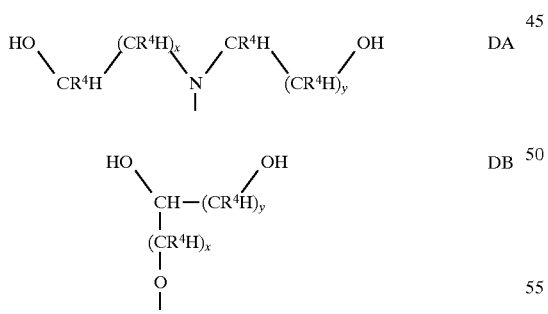  DA

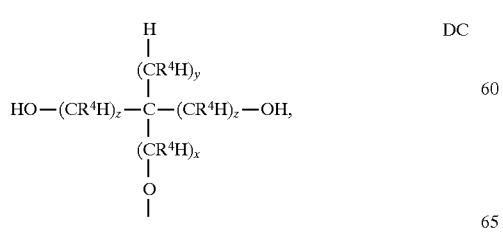  DB

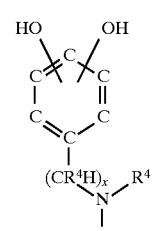  DC

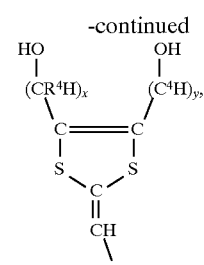  DD

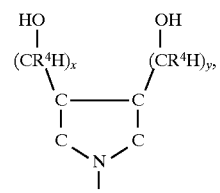  DE

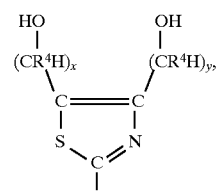  DF

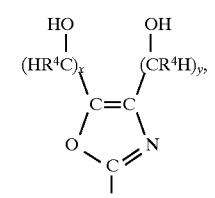  DG

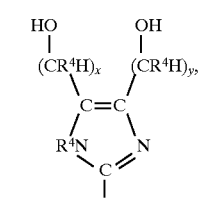  DH

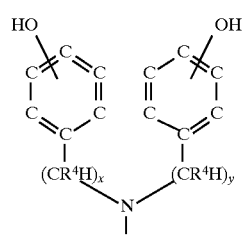  DI

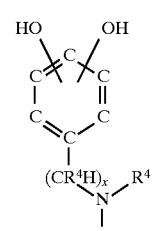  DJ

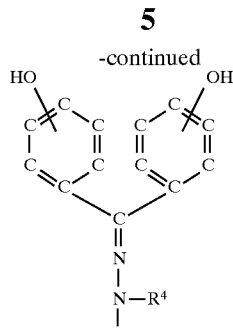

wherein OH stands for the OH-groups of formula I, x, y and z stand for an integer 0–4, $R^4$ stands for -H or a (halogenated) alkyl having 1–6 carbon atoms, -phenyl.

Especially preferred among these are electron-donating groups D that include at least two aromatically substituted hydroxy groups. By aromatically substituted hydroxy groups are meant, hydroxy groups directly attached to an aromatic ring.

Suitable compounds according to formula II are halogenated bischloroformates. Bischloroformates can be prepared by the base-catalysed reaction of a diol with phosgene. Generally, the diol is dissolved in toluene and phosgene is added slowly at 0° C., followed by the slow addition of a base. The most preferred diols for use in making compounds of formula II are hexafluorobisphenol A and hexafluorotetrabromo bisphenol A, since these materials generally provide polycarbonates having a very low loss of signal. If it is desired to increase the refractive index, for instance, 4,4'-sulfonyldiphenol bischloroformate, or hexafluorotetrabromo bisphenol A can be included in the monomer mixture. Thus, the refractive index can be precisely adjusted by varying the bromo-, chloro-, and 4,4'-sulfonyldiphenol content of the monomer mixture.

The groups P and Q may be anything as long as they are good leaving groups.

In addition to the foregoing components, the polycarbonates of the present invention may include additional monomers which may be employed to render the final polycarbonate cross-linkable. Examples of such monomers are cross-linkable group-containing diols or bischloroformates. This cross-linkable group may be an alkenyl such as allyl or vinyl, epoxy, isocyanate, (meth)acrylate or maleimide group. It is also possible to add polyisocyanates and polyepoxides to the monomer mixture to obtain a cross-linkable polycarbonate. Cross-linkable materials are preferred for use in waveguides made by spin-coating layers of polycarbonates one on top of another. Therefore, the present invention also pertains to both cross-linkable, and cross-linked polycarbonates obtained from the monomer mixture described above, including a cross-linkable group containing monomer or an additional cross-linker.

The polycarbonates according to the invention may also contain anti-oxidants. Suitable anti-oxidants are described in EP-A2-0 608 493 on page 7, which is herein incorporated by reference for this purpose.

The polycarbonates according to the invention may be fabricated into an optical waveguide component having a layered structure comprising the polycarbonate sandwiched between two deflection layers of lower refractive index material than the waveguiding polycarbonate layer. One of the methods of defining waveguide channels in the polycarbonate layer is by selectively changing the refractive index by irradiation. This process is often referred to as bleaching and generally results in a decrease of the refractive index of the polycarbonate material. The polycarbonates according to the present invention comprise NLO groups which are both readily bleached and can be rendered NLO active by poling. The waveguide channels may also be defined by other techniques such as reactive ion etching, molding, and laser ablation. Thus, the polycarbonates of the invention are suitable for use in both active and passive waveguide components as well as in thermo-optic waveguide components.

Poled films of the present polycarbonates have been found to have excellent thermal stability particularly due to their high glass transition temperatures. In addition, the non-linear optical behavior of films of the present polycarbonates, as measured by the Pockel's coefficient ($r_{33}$) is good as compared with other NLO polymers. Especially the stability of the Pockel's coefficient is good. Finally, these NLO polycarbonates have a minimal loss of signal at the telecommunication windows (approximately 1300–1370 and 1500–1600 nm.)

One method for applying the polycarbonates to a substrate is by means of spin coating. In order to be able to spin-coat the polycarbonates, they are first dissolved in a solvent which is capable of wetting the substrate to be coated. The resulting polycarbonate solution should also be filterable. Suitable solvents for spin-coating polycarbonates are, for instance, tetrahydrofuran, o-xylene, mesitylene, gamma-butyrolactone, ethylene glycol diacetate, diglyme, cyclohexyl acetate, tetrachloroethane, cyclopentanone, 2-methyl cyclohexanone, and 2-methoxy-ethylacetate. After coating the solution onto the substrate, the solvent is evaporated to leave a film of polycarbonate. This film of polycarbonate can then be poled by means of the so-called DC-induced Pockel's effect technique. This technique involves applying both A.C. and D.C. voltage to the sample. The D.C. voltage orients the molecules and induces the Pockel's effect, while the A.C. voltage field serves to measure the Pockel's coefficient. A typical D.C. voltage field intensity is in the range of 10–30 V/$\mu$m. In order to obtain films of sufficient thickness for use as optical waveguides, it may be necessary to spin coat several layers of polycarbonate one on top of the other. Further, a cladding layer should be provided on the NLO active layer. Such cladding layers can be made from cross-linkable polycarbonates in accordance with the present invention, for when these materials are partially or completely cross-linked, they are no longer soluble in the solvent. The present invention is also directed to NLO waveguides which comprise the polycarbonates according to the present invention, as well as other photonic devices comprising the polycarbonates of the present invention. The invention will now be further illustrated with reference to the following examples.

EXAMPLES

Example 1

Synthesis of Polycarbonate 1

Monomer 1: Synthesis of 2-{4-[bis(2-hydroxyethyl) amino]phenyl}-3-cyano-butenedinitrile A monomer of formula I wherein the D group is the moiety DA (x,y=1) listed in the specification was prepared in the following manner:

A mixture of 4.5 g (0.025 moles) of N-phenyl diethanol amine and 3.4 g (0.026 moles) of tetracyanoethylene in 25 ml of N,N-dimethyl formamide was stirred for 17 hours at 20° C. After evaporation of the solvent, column chromatography over 200 g silica gel using a 95% dichloromethane/5% methanol mixture as an eluent, yielded 5.8 g (82%) of monomer 1. The melting point was 164°–167° C.

A polycarbonate was made by polymerising, in tetrahydrofuran, monomer 1 with the bischloroformate of 4,4'-(hexafluoroisopropylidene)diphenol. The resulting polycarbonate polymer had a glass transition temperature of 130°–135° C. and a weight average molecular weight of 14 000.

A film of polycarbonate 1 was spin coated onto a silicon substrate. The film thus formed was poled by means of the DC-induced Pockel's effect technique described herein. The corrected Pockel's coefficient ($r_{33}$) for this film was 0.51 (measured at a wavelength of 841 nm), the ratio of the Pockel's coefficient with the electric field off versus the Pockel's coefficient with the electric filed on ($\eta_{33}$) was measured to be 0.95. The high $\eta_{33}$ shows that the stability of the Pockel's coefficient is very good.

Example 2

Synthesis of Polycarbonate 2

Monomer 2: synthesis of 2-[4-(3,4-dihydroxypyrrolidin-1-yl)phenyl]-3-cyano-butenedinitrile A monomer of formula I employing as the D group a group of the formula DE (with y=0) given in the specification was prepared in the following manner:

A mixture of 4.5 g (0.025 moles) of N-phenyl-3,4-dihydroxy pyrrolidine and 3.4 g (0.026 moles) of tetracyanoethylene in 25 ml of N,N-dimethyl formamide was stirred for 18 hours at 20° C. After evaporation of the solvent the product was purified by column chromatography over 200 g silica gel, using a 94% dichloromethane/6% methanol mixture as an eluent. The yield was 5.5 g (78%). The melting point was 216°–219° C.

A polycarbonate polymer was made by polymerising monomer 2 with the bischloroformate of 4,4'-(hexafluoroisopropylidene)diphenol in tetrahydrofuran as solvent. The resulting polymer had a glass transition temperature of 184°–194° C. and a weight average molecular weight of 8 100.

Polycarbonate 2 was dissolved in cyclopentanone and spin coated onto a silicon substrate. The film of polycarbonate 2 on the silicon substrate was poled by means of the DC-induced corrected Pockel's effect technique. Then, the corrected Pockel's coefficient was measured to be 0.25 using light having a wavelength of 841 nanometers. The $\eta_{33}$ was measured to be 0.95.

Example 3

Synthesis of Polycarbonate 3

Monomer 3: Synthesis of 2-{4-[N-methyl-bis(4-hydroxyphenyl)methyl-methylidenehydrazino]phenyl}-3cyano-butenedinitrile A monomer of the formula I wherein the D group is a group DK ($R^4$=CH$_3$) as shown in the specification was prepared in the following manner:

A mixture of 10.7 g (0.050 moles) of 4,4'-dihydroxy-benzophenone, 6.1 g (0.050 moles) of 1-methyl-1-phenylhydrazine and 3 drops of concentrated sulphuric acid in 50 ml of ethanol was heated at reflux for 64 hours and then 150 ml of hot water was added while hot. Crystallisation occurred upon cooling to 20° C. The product was collected by suction filtration and dried to give 11.2 g (73%) of yellow crystals, melting point 192°–192.5° C. A mixture of 6.4 g (0.020 moles) of this hydrazone and 2.6 g (0.020 moles) of tetracyanoethylene in 25 ml of N,N-dimethylformamide was stirred for 16 hours at 20° C. After evaporation of the solvent, the product was purified by chromatography over 200 g of silica gel, using a mixture of 30% ethyl acetate and 70% hexane as an eluent. This yielded 6.1 g (73%) of greenish black crystals.

Polycarbonate 3 was made by polymerising monomer 3 with the bischlorformate of 4,4'-(hexafluoroisopropylidene)-di-(2,6-dibromophenol) in tetrahydrafuran.

The resulting polymer had a glass transition temperature of 198°–205° C. and a weight average molecular weight of 8 950.

Example 4

Synthesis of Polycarbonate 4

Polycarbonate 4 was made by polymerising monomer 3 with the bischloroformate of 4,4'-(hexafluoroisopropylidene)diphenol in tetrahydrafuran. The resulting polymer had a glass transition temperature of 179°–186° C. and a weight average molecular weight of 9900.

Polycarbonate 4 was dissolved in cyclopentanone and spin coated onto a silicon substrate. The spin coated film was then poled using the DC-induced Pockel's effect technique. The corrected Pockel's coefficient was measured to be 0.62 using light with a wavelength of 841 nanometers. The $\eta_{33}$ was measured to be 0.90. The optical loss measured by means of the prism coupling-in technique as described in Optics Letters, Vol. 17 (1992), pp. 1506–1508, was 0.42 dB/cm at 1305 nm and 0.63 at 1565 nm.

Comparative Example 5

Polycarbonate 5*

A polycarbonate as described in Example 18 of U.S. Pat. No. 5,208,299 was made by polymerizing a monomer of formula I wherein the D group is the moiety DK (with $R^4$=H), along with bisphenol A. The resultant polymer had a glass transition temperature of 180/211° C. and a weight average molecular weight 16 500.

The polycarbonate 5* was dissolved in tetrahydrofuran and spin coated onto a silicon substrate. The film of polycarbonate 5* on the silicon substrate was poled by means of the DC-induced corrected Pockel's effect technique. Then, the corrected Pockel's coefficient was measured to be 0.35 pm/V using light having a wavelength of 841 nanometers. The $\eta_{33}$ was measured to be 0.52. The optical loss measured by means of the prisma incoupling technique at 1305 nm appeared to be approximately the same (0.4 dB/cm) as in the in polycarbonates according to the invention. However the loss at 1565 nm appeared to be much higher than in the polycarbonates according to the invention (4 dB/cm).

The foregoing examples and description of the invention were presented for the purposes of illustration and description only and are not to be construed as limiting the invention in any way. The scope of the invention is to be determined from the claims appended hereto.

We claim:

1. A non-linear optically active polycarbonate obtained by polymerising a monomer mixture comprising:

an NLO diol satisfying formula (I):

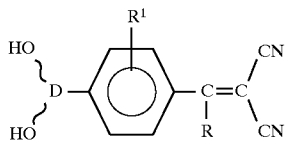

wherein

D is a trivalent electron-donating group comprising 2–30 aliphatic, alicyclic, aromatic or heterocyclic carbon atoms and which includes at least one atom selected from alkoxy oxygen atoms, sulphur atoms, selenium atoms, and nitrogen atoms directly or conjugately bonded to the benzene ring;

R is selected from hydrogen, (halogenated) $C_1$–$C_6$ alkyl and cyano;

$R^1$ is selected from halogen, -$R^2$, -$OR^2$, -$COR^2$, -CN, or -CF3, wherein $R^2$ is selected from hydrogen, halogen, C1–C6 alkyl, and halogen-substituted C1–C6 alkyl, or a compound according to formula II:

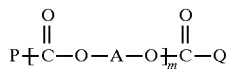

formula II wherein:

P stands for -Cl, O-$R^3$, imidazole,

Q stands for -Cl, O-$R^3$, imidazole, wherein $R^3$ stands for a (halogenated) alkyl group having 1–6 carbon atoms, (halogenated) phenyl, m is an integer from 1 to 5, with the A-groups being the same or different, and A stands for

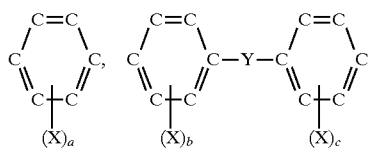

wherein:

Y stands for -$SO_2$-, halogenated alkyl having 1–6 carbon atoms, -O-, -S- or -C($C_6H_5$)$_2$-, X is a halogen, or $C_1$–$C_6$ alkyl, a is an integer from 0 to 4, with the X-groups being the same or different, b is an integer from 0 to 4, with the X-groups being the same or different, and c is an integer from 0 to 4, with the X-groups being the same or different.

2. The non-linear optically active polycarbonate of claim 1 wherein D is a group selected from the following formulae:

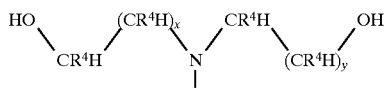
DA

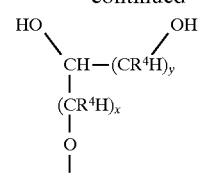
DB

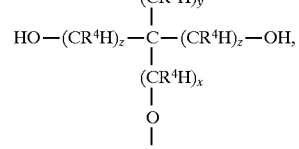
DC

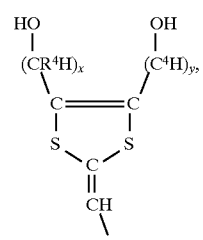
DD

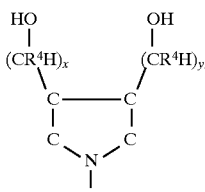
DE

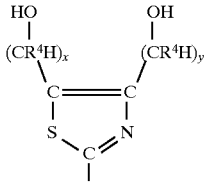
DF

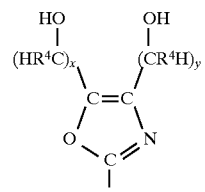
DG

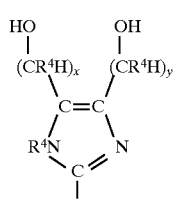
DH

-continued

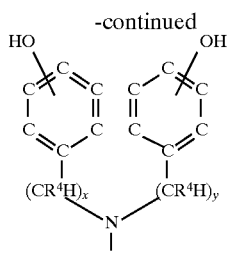 DI

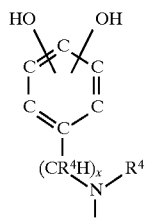 DJ

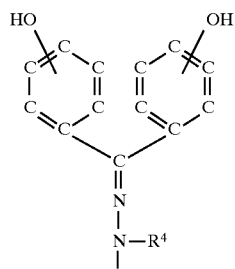 DK wherein
OH stands for the OH-groups of formula I,
x and y stand for an integer 0–4,
$R^4$ stands for -H or an alkyl having 1–6 carbon atoms, phenyl or $CF_3$.

3. The non-linear optically active polycarbonate of claim 1 wherein the monomer of formula II comprises hexafluoro bisphenol A bischloroformate.

4. The non-linear optically active polycarbonate of claim 2 wherein the monomer of formula II comprises hexafluorotetrabromo bisphenol A bischloroformate.

5. The non-linear optically active polycarbonate of claim 2 wherein group D in the monomer of formula I is a group of the formula DK.

6. The non-linear optically active polycarbonate of claim 1 wherein the polycarbonate is cross-linkable or crosslinked.

7. The non-linear optically active polycarbonate of claim 1 wherein the group D in the monomer of formula I includes at least two aromatically substituted hydroxy groups.

8. A non-linear optically active waveguide component comprising the non-linear optically active polycarbonate of claim 1.

9. A thermo-optic waveguide component comprising the non-linear optically active polycarbonate of claim 1.

10. A passive waveguide component comprising the non-linear optically active polycarbonate of claim 1.

11. The non-linear optically active polycarbonate of claim 1 wherein Y stands for $CF_2$ or $C(CF_3)_2$.

* * * * *